(12) United States Patent
Brodfuehrer et al.

(10) Patent No.: US 8,364,677 B2
(45) Date of Patent: Jan. 29, 2013

(54) METHOD AND APPARATUS FOR GENERATING PARTITIONING KEYS FOR A RANGE-PARTITIONED DATABASE

(75) Inventors: Richard J. Brodfuehrer, Endicott, NY (US); Terence Patrick Purcell, Springfield, IL (US); Michael S. Wang, Wappingers Falls, NY (US); Kim Jon Worm, Red Hook, NY (US)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 12/184,291

(22) Filed: Aug. 1, 2008

(65) Prior Publication Data

US 2010/0030800 A1    Feb. 4, 2010

(51) Int. Cl.
*G06F 7/00* (2006.01)
*G06F 17/30* (2006.01)

(52) U.S. Cl. ........ 707/737; 707/705; 707/736; 707/752; 707/964; 707/966; 707/967; 707/972

(58) Field of Classification Search .................. None
See application file for complete search history.

(56) References Cited

U.S. PATENT DOCUMENTS

| | | | |
|---|---|---|---|
| 5,625,815 A | 4/1997 | Maier et al. ...................... 707/8 |
| 5,949,788 A * | 9/1999 | Friedman et al. .............. 709/200 |
| 6,269,375 B1 * | 7/2001 | Ruddy et al. ........... 707/999.101 |
| 6,338,063 B1 * | 1/2002 | Barr .............................. 707/704 |
| 6,587,854 B1 | 7/2003 | Guthrie et al. .................... 707/9 |
| 7,512,621 B2 * | 3/2009 | Shen et al. ................. 707/999.1 |
| 7,783,747 B2 * | 8/2010 | Abernethy et al. ........... 709/224 |
| 7,809,769 B2 * | 10/2010 | Butcher et al. ................ 707/803 |
| 2005/0015763 A1 | 1/2005 | Alexander, III et al. ....... 718/100 |
| 2005/0234861 A1 | 10/2005 | Ingels et al. ...................... 707/1 |
| 2005/0251524 A1 | 11/2005 | Shukla .......................... 707/100 |

OTHER PUBLICATIONS

RD 01-119 n41779 p. 121-122: "Supporting LDAP Multi-Value Attributes with Relational Tables".
RD 01-2001 n441159 p. 165: "New DB2 table model with minimizes numbers of tables and allows higher scalability".

* cited by examiner

*Primary Examiner* — Jau-Shya Meng
(74) *Attorney, Agent, or Firm* — Cantor Colburn LLP; William A. Kinnaman, Jr.

(57) ABSTRACT

A method and apparatus for generating partition keys in an information handling system having a partitioned database. Partition keys are generated by concatenating a partition subrange identifier specifying a subrange of key values and a sequence number specifying a particular key value within a subrange. Partition keys are assigned with the aid of a partition key control table that stores subrange and available key block information and is updated whenever key blocks are reserved or the database is repartitioned. An activity indicator maintained for each partition indicates recent activity in the partition. In response to a request for a partition key, a partition is selected for key assignment having the least recent activity as indicated by its activity indicator. Specific activity indicators disclosed include a timestamp for each partition in the control table, as well as a count of the threads in a particular application instance concurrently accessing a partition.

4 Claims, 14 Drawing Sheets

Key Mapping of partitioned table space

List of partitions in tablespace

| Struct | DB_PARTITION |
|---|---|
| Partition high key value | PARTID |
| Current Key base | BASEKEY |
| Key sequence number | nextKeySequence Range (00 ... 99 ) |
| Next partition pointer | nextPartition |
| Current Active Threads | REFCOUNT |

116

PART_INFO Partition Key Control Table

| PARTID | NEXTKEY | TIMESTAMP |
|---|---|---|
| 1999999 | 1990100 | 2008-01-18-15.20.46.429111 |
| 3999999 | 3990100 | 2008-01-18-15.20.12.429222 |
| 5999999 | 5990100 | 2008-01-18-15.20.47.429333 |
| 7999999 | 7990100 | 2008-01-18-15.20.48.429444 |
| 9999999 | 9990100 | 2008-01-18-15.20.49.429555 |

114

Table space with 5 partitions

| | |
|---|---|
| 112e | 9999999 ... 8000000 |
| 112d | 7999999 ... 6000000 |
| 112c | 5999999 ... 4000000 |
| 112b | 3999999 ... 2000000 |
| 112a | 1999999 ... 0000000 |

Primary keys for partition P5
Primary keys for partition P4
Primary keys for partition P3
Primary keys for partition P2
Primary keys for partition P1

110

All possible subranges in partition #5 with a 3 digit subrange identifier

Old PART_INFO Partition Key Control Table

| PARTID | NEXTKEY | TIMESTAMP |
|---|---|---|
| 1999999 | 1990300 | ... |
| 3999999 | 3990200 | ... |
| 5999999 | 5990300 | ... |
| 7999999 | 7990200 | ... |
| 9999999 | 9990200 | ... |

114

802 — Strip the subrange identifier from each NEXTKEY

| 0300 |
|---|
| 0200 |
| 0300 |
| 0200 |
| 0200 |

804 — Find the LGVAL (Highest Value Present)

118 — Catalog Tables (Current partitioning Info) Four Partitions

New PART_INFO Partition Key Control Table

| PARTID (NEW) | NEXTKEY (NEW) | ... |
|---|---|---|
| 2499999 | 2490300 | ... |
| 4999999 | 4990300 | ... |
| 7499999 | 7490300 | ... |
| 9999999 | 9990300 | ... |

114'

806 — Concatenate new partition subrange identifiers with 0300

Key Mapping of partitioned table space

List of partitions in tablespace

| Struct | DB_PARTITION |
|---|---|
| Partition high key value | PARTID |
| Current Key base | BASEKEY |
| Key sequence number | nextKeySequence Range (00 ... 99) |
| Next partition pointer | nextPartition |
| Current Active Threads | REFCOUNT |

116

PART_INFO Partition Key Control Table

| PARTID | NEXTKEY | TIMESTAMP |
|---|---|---|
| 1999999 | 1990100 | 2008-01-18-15.20.46.429111 |
| 3999999 | 3990100 | 2008-01-18-15.20.12.429222 |
| 5999999 | 5990100 | 2008-01-18-15.20.47.429333 |
| 7999999 | 7990100 | 2008-01-18-15.20.48.429444 |
| 9999999 | 9990100 | 2008-01-18-15.20.49.429555 |

METHOD AND APPARATUS FOR GENERATING PARTITIONING KEYS FOR A RANGE-PARTITIONED DATABASE

BACKGROUND OF THE INVENTION

1. Field of the Invention

The present invention relates to an improved data processing system and, in particular, to a method for generating partitioning keys in a multithreaded application to reduce contention when inserting data into a range-partitioned database.

2. Description of the Related Art

Database management systems (DBMSs), especially relational database management systems (RDBMSs), are well known in the art. In such systems, data is organized into tables, or relations, each of which contains one or more rows and one or more columns. Each row (also known as a tuple or record) of a table corresponds to a particular data object (such as an employee), while each column corresponds to a particular attribute of that object, such as name, age, department, salary, or the like. Database systems are described in such online references as Wikipedia, as well as in more traditional references such as Date, C. J., *An Introduction to Database Systems*, Eighth Edition, Addison Wesley, 2003, incorporated herein by reference.

In many database applications, partitioning of the database is used to improve scalability and performance. Database partitioning is a method that breaks a large database table into smaller table segments, where each table segment independently manages its own locks. To accomplish this, the partitioning boundaries are defined by the user through the use of Data Definition Language (DDL). The partitioning boundaries, also referred to as the partition high key values, are values from one or more columns from the database table column that separate one partition of the table from another partition. Once the boundaries are defined, then each row in the database table will fall into a specific partition based on the value of that row's partitioning column(s). Typically, more attention is given to read access than to insertion of new data. However, multithreaded applications which perform high-volume inserts of new data can achieve performance benefits from partitioning as well, especially when concurrent threads insert into different partitions.

Many applications use a generated key for new data, where this key also serves as the partitioning key and the data is partitioned using range partitioning. Range partitioning selects a partition by determining if the partitioning key is inside a certain range of values. One common approach for key generation is to use a monotonically increasing key by incrementing successive key values. This has the advantage of keeping the data organized in sequence, clustered by the generated key. It also has the advantage of assigning space for new data at the end of the partition, which is customarily far more efficient than inserting in the middle of existing data. One drawback with this approach is that data is not immediately spread across partitions. Instead, the generated key must progress through the key ranges chosen for the partitions as data accumulates over time before a good spread of data occurs. Another drawback of using monotonically increasing key values is the formation of "hotspots" in the database when concurrent access occurs in a multithreaded application environment, both during initial insertion of new data and subsequent access of the new data. Collisions on "hotspots" often cause contention between competing threads, due to serialization in locking and space allocation in localized areas of the database. Additionally, if multiple data records are inserted for each generated key, multithreaded applications may not achieve the full benefit of keeping inserted data in sequence, as two competing threads with sequential generated keys may interleave their data. When the underlying database management system uses page-level locking, interleaved data on the same page can cause deadlocks between application threads which are doing concurrent updates to otherwise unrelated records.

One method commonly used to overcome both drawbacks above is to reverse the bytes of a monotonically increasing key. This has the effect of continuously spreading new data evenly over the entire key range, placing it in the various partitions in a round-robin fashion. This avoids hotspots, as each subsequent insertion is at another point in the database. However, this approach does not keep the data well organized, potentially requiring more frequent data reorganization. Furthermore, inserts are not done at the end of previously existing data, thus sacrificing efficiency during insert. Finally, simply reversing the bytes of an incremented value does not guarantee that two successive keys are in separate partitions unless there are enough partitions defined with key ranges that are chosen to optimize the key generation procedure. If successive keys are defined in the same partition, multithreaded workloads will compete for resources within that partition.

Another method used to overcome the drawbacks of a monotonically increasing key is to generate a random key. This has basically the same advantages and disadvantages as the method of reversing the bytes of the monotonically increasing key noted above.

None of the three key generation mechanisms noted above—specifically, using a monotonically increasing key, reversing the bytes of a monotonically increasing key, and generating a random key—accomplish all of the following goals: (1) keeping newly inserted data organized in key sequence; (2) continuously spreading new data uniformly across the partitions; and (3) maximizing the isolation of inserts from concurrent threads into different partitions.

What is needed is a key generation procedure which achieves all of these goals to help maximize the performance benefit of database partitioning.

SUMMARY OF THE INVENTION

Techniques are described for generating a partitioning key for newly inserted data into a range-partitioned database in a multithreaded application. The techniques ensure the data is evenly distributed across the partitions in real time, with minimal interference between concurrent threads even when multiple instances of the application are active. Furthermore, the data remains well organized in ascending key sequence within each partition, adding new data to the end of each partition to maximize insert efficiency. Finally, these techniques accommodate repartitioning of the data.

One aspect of the present invention contemplates a method, apparatus and program storage device for generating a partition key in an information handling system in which a database table having a plurality of entries is divided into a plurality of partitions. Each of the partitions has a corresponding range of partition keys, and each of the entries is assigned to one of the partitions in accordance with a partition key generated for such entry. In accordance with this aspect of the invention, there is generated a partition subrange identifier specifying a subrange of key values in one of the partitions, as well as a sequence number specifying a particular key value within a subrange. The partition key is generated by combining the partition subrange identifier and the sequence number, for example, by concatenating the two values.

Preferably, each partition has a plurality of subranges of key values, and the partition subrange identifier specifies a highest available subrange of key values in that partition. Further, each sequence number is preferably generated by incrementing a previous sequence number. Such a sequence number may increment for each new row inserted, regardless of the partition, or may increment after all partitions have utilized the current sequence number since uniqueness is guaranteed by combining the partition subrange identifier and the sequence number.

Preferably, there is maintained a control table storing for each of the partitions a highest key value for that partition and a base key value specifying a block of key values from which keys are currently being assigned from that partition. Preferably, furthermore, in response to a repartitioning of the database into new partitions, the control table is updated to store for each of the new partitions a new highest key value and base key value. The base key value stored for each of the partitions may comprise a combination of a partition subrange identifier and a base key sequence number, in which the new base key sequence numbers are determined by the largest value of any of the base key sequence numbers before repartitioning.

In accordance with another aspect of the present invention, there is maintaining for each of the partitions an activity indicator indicating recent activity in the partition. In response to a request for a partition key, a partition is selected having a least recent activity as indicated by the activity indicator for the partition, and a partition key is generated from the range of partition keys corresponding to the selected partition.

One such activity indicator may comprise a count of requesters currently accessing a partition, in particular, to insert new data into the partition. The count for a partition is incremented upon initiation of access to the partition and decremented upon completion of access to the partition. If the requester count is used as the activity indicator, the selecting step comprises selecting the partition having the lowest count of requesters currently accessing the partition. If multiple partitions have the same lowest count, then one may select from among those partitions the partition having a greatest number of keys that have been reserved but not assigned. The activity indicator may also be used to disable the insertion of new rows into a partition to allow data reorganization since database management systems generally allow an online reorganization process which is more efficient when processing read-only data. Also, the disablement of partition(s) may be necessary to allow data volumes to rebalance across all partitions due to uneven distribution of data across partitions or if the keys are at risk of exceeding the partition range.

Alternatively or additionally, there may be maintained for each of the partitions a next key indicator identifying a block of one or more available partition keys for the partition. In such case, the activity indicator may comprise a time stamp indicating when the next key was last updated, the selecting step may comprise selecting the partition having an oldest time stamp. When a given block of available partition keys is issued to a requester (e.g., an application instance), the corresponding next key indicator is updated to identify a next block of partition keys, and the time stamp is updated to indicate when the next key indicator was most recently updated.

The advantages of the present invention may be briefly summarized. The inserted data is evenly distributed across the partitions in real time. Data insertion is done with minimal interference between concurrent threads, even when multiple instances of an application are active. Data remains well organized in ascending key sequence within each partition, adding new data to the end of each partition to maximize insert efficiency. Finally, these techniques accommodate repartitioning of the data.

While the invention is not limited to any particular embodiment, the invention is preferably implemented as one or more software programs running on a general-purpose computer. As is well-known in the art, such software programs are realized as one or more program storage devices readable by a machine, tangibly embodying a program of instructions executable by the machine to perform a specified method. Further, such software programs, when combined with the general-purpose computer, form an apparatus that is programmed to perform the steps of the invention, with the program portions, in combination with the computer hardware, constituting the corresponding means for performing the specified method steps.

BRIEF DESCRIPTION OF THE DRAWINGS

FIG. 3 shows the subranges in a partition of the present invention.

FIG. 8 shows the procedure for updating an existing partition key control (PART_INFO) table due to a change in database partitioning.

FIG. 9 shows the in-memory structure DB_PARTITION that contains information obtained from the partition key control table.

DETAILED DESCRIPTION OF THE INVENTION

This invention pertains to range-partitioned databases where an application generates the partitioning key for newly inserted data. Techniques are described whereby the generated key can be constructed and managed in such a way as to achieve benefits similar to those of previously used approaches while overcoming some of the weaknesses of those approaches. The techniques within this invention allow the application to achieve the following goals:

1. Keeping newly inserted data organized in key sequence to avoid the need for frequent maintenance activity to reorganize the data.
2. Inserting new data at the end of previously existing data in each partition, as this placement of new data is customarily the most efficient.
3. Continuously spreading new data uniformly across the partitions.
4. Maximizing the isolation of inserts from concurrent threads into different partitions, including the case where concurrent threads are executing in multiple instances of the application. This reduces contention between threads and avoids interleaved data, thereby reducing the likelihood of deadlocks.

The present invention uses database partitioning to improve the performance of concurrent insert operations in a database-backed application, allowing concurrent application threads to work in separate partitions, reducing the chance for contention. The partition chosen for newly inserted data is determined by the value of the partitioning key. Applications can direct new data into the desired partition by constructing the key appropriately.

This description below discusses implementation of the invention using a partitioning key which is a numeric type of length 7 (i.e., a seven-digit number). However, keys of other lengths and other types of keys (e.g., text strings) could be used as well.

Figure 1:
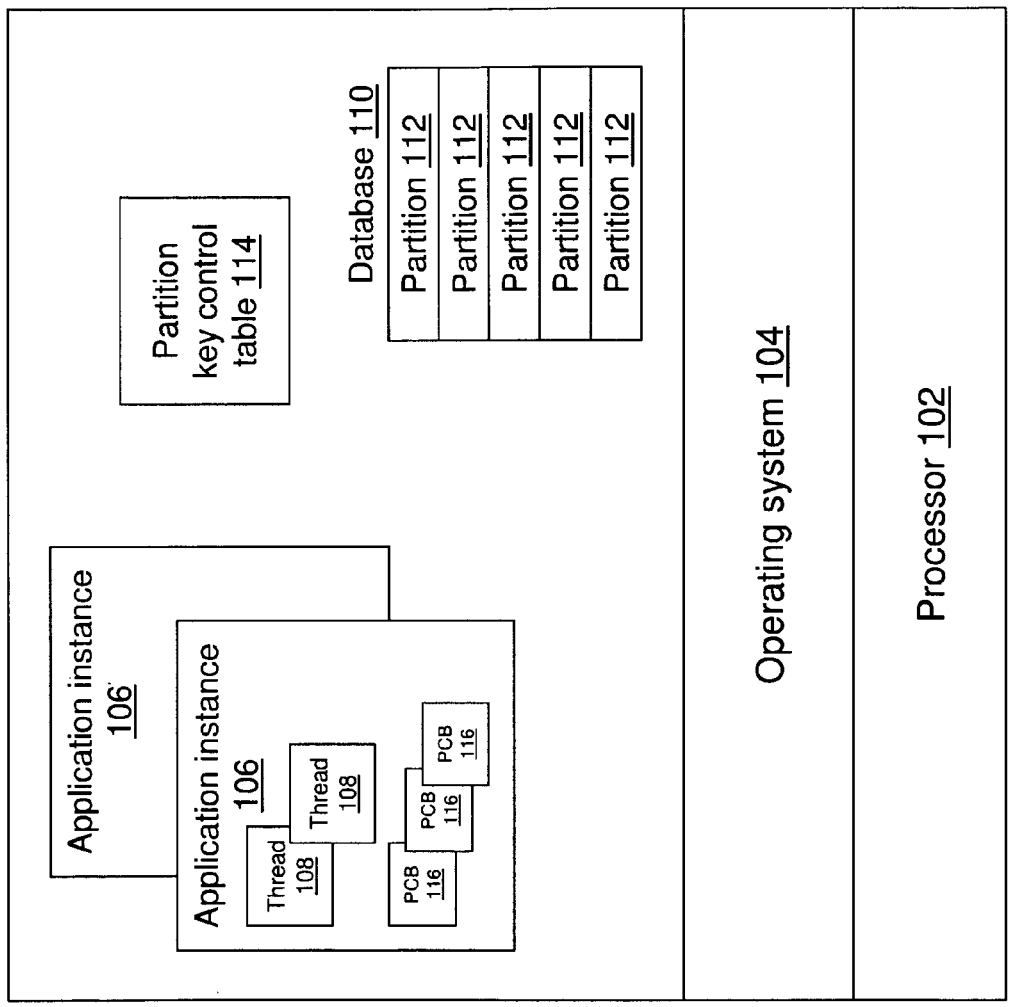
FIG. 1 shows the basic elements of one embodiment of the invention as implemented in an information handling system.

FIG. 1 shows the basic elements of one embodiment of the invention as implemented in an information handling system 100 comprising a processor 102, an operating system 104 and one or more application instances 106 running on operating system 104. (In the figures and discussion that follow, individual instances of multiply instantiated entities such as application instances 106 are distinguished where appropriate by reference numbers such as 106a, 106b, etc.) Although the present invention is not limited to any particular hardware-software platform, in the system 100 shown, processor 102 may comprise an IBM System z10 server, and operating system 104 may comprise the IBM z/OS operating system. ("System z10" and "z/OS" are trademarks of IBM Corporation.) As shown in the figure, each of application instances 106 has one or more threads 108. Threads 108 access a database 110, managed by a database management system (DBMS) such as IBM DB2 (not separately shown), that is divided into partitions 112. ("DB2" is a trademark of IBM Corporation.)

In addition to managing the use of system resources by entities such as application instances 106, operating system 104 performs various system services for the application instances and their constituent threads 108, as is conventional in the art.

Also shown in FIG. 1 are various data structures used to manage the assignment of partition keys. These data structures include a partition key control (PART_INFO) table 114 that is common to the application instances 106 and is accessed by them. To access the control table 114, the application instances 106 use SQL to talk to the database 110 through an Open Database Connectivity (ODBC) connector when obtaining blocks of partition keys, as described further below; communication between the application instances 106 and the database 110 may rely on any suitable protocol, such as the use of Structured Query Language (SQL) to communicate with the database 110 through an Open Database Connectivity (ODBC) connector. Additionally, each application instance 106 has its own set of partition control blocks 116 (DB_PARTITION), one control block 116 for each partition 112, that are accessible by threads 108 in that application instance. Control table 114 and control blocks 116 are used to control the assignment of individual partition keys and blocks of keys in the manner described below.

In accordance with one aspect of the present invention, the partition key is interpreted as logically separated into two parts. The first part, consisting of one or more leftmost digits, is referred to herein as the partition subrange identifier. The second part, consisting of the remaining digits, is the range of values assignable from that partition subrange. In accordance with this aspect of the invention, when new data is pending for insertion into the database 110, an implementation first decides which partition subrange the data goes into by looking at partition information, then assigns a unique ascending value within that partition subrange. Combining the partition subrange identifier with the ascending value produces the key that is assigned to the data.

Figure 2:
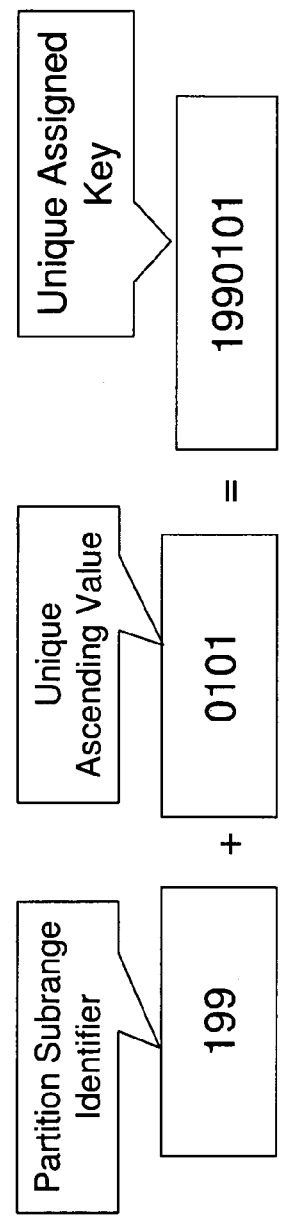
FIG. 2 shows the structure of the unique keys of the present invention.

For example, if the first three digits are used as the partition subrange identifier and a key needs to be assigned for new data to be inserted into the database 110, putting the key inside partition subrange 199 and giving it an ascending value of 0101 results in the key 1990101. This is demonstrated in FIG. 2, which shows a partition subrange identifier of 199 being concatenated with a unique ascending value of 0101 to form a unique assigned key of 1990101. Or, to put it another way, a key of given length is resolved into a subrange identifier and an ascending value. The number of digits used for the partition subrange identifier depends on the maximum number of partitions 112 that are used for the database 110. In the above example, where three digits are used to represent the partition subrange identifier, up to a maximum of 1000 partitions 112 can be supported. This resolution of key parts is arbitrary, however, and may be varied to fit the needs of a particular application. For example, if more than 1,000 partition subranges are required, the same seven-digit key could be resolved instead into a four-digit subrange identifier (yielding 10,000 subranges) and a three-digit ascending value.

FIG. 3 shows the subranges in a partition 112. Shown in the figure on the left is a database 110 divided into five partitions 112a-112e (P1-P5), with each partition having the key ranges set forth in the table below:

| Partition | Lower Limit | Upper Limit |
|-----------|-------------|-------------|
| P1        | 0000000     | 1999999     |
| P2        | 2000000     | 3999999     |
| P3        | 4000000     | 5999999     |
| P4        | 6000000     | 7999999     |
| P5        | 8000000     | 9999999     |

In addition to showing key ranges, FIG. 3 shows on the right the set of all possible subranges in partition 112e (P5) with a three-digit subrange identifier. These extend, in ascending order, from a subrange identifier of 800 up through and including a subrange identifier of 999. Similar sets of subrange identifiers exist for the other partitions 112a-112d (P1-P4) shown in FIG. 3.

Since there is at least one subrange per partition 112, one aspect of the invention contemplates choosing the highest partition subrange in a particular partition 112 during application startup for key assignment. As described below, this aspect of the invention contemplates assigning keys in ascending order from that subrange, stopping when the upper limit of the subrange is reached. Keys thus generated for insertion into a particular partition 112 always belong to the partition subrange chosen for that partition 112. The use of the highest partition subrange for each partition 112 is done to ensure that data is inserted at the end of each partition 112 even if repartitioning occurs.

Figure 4:
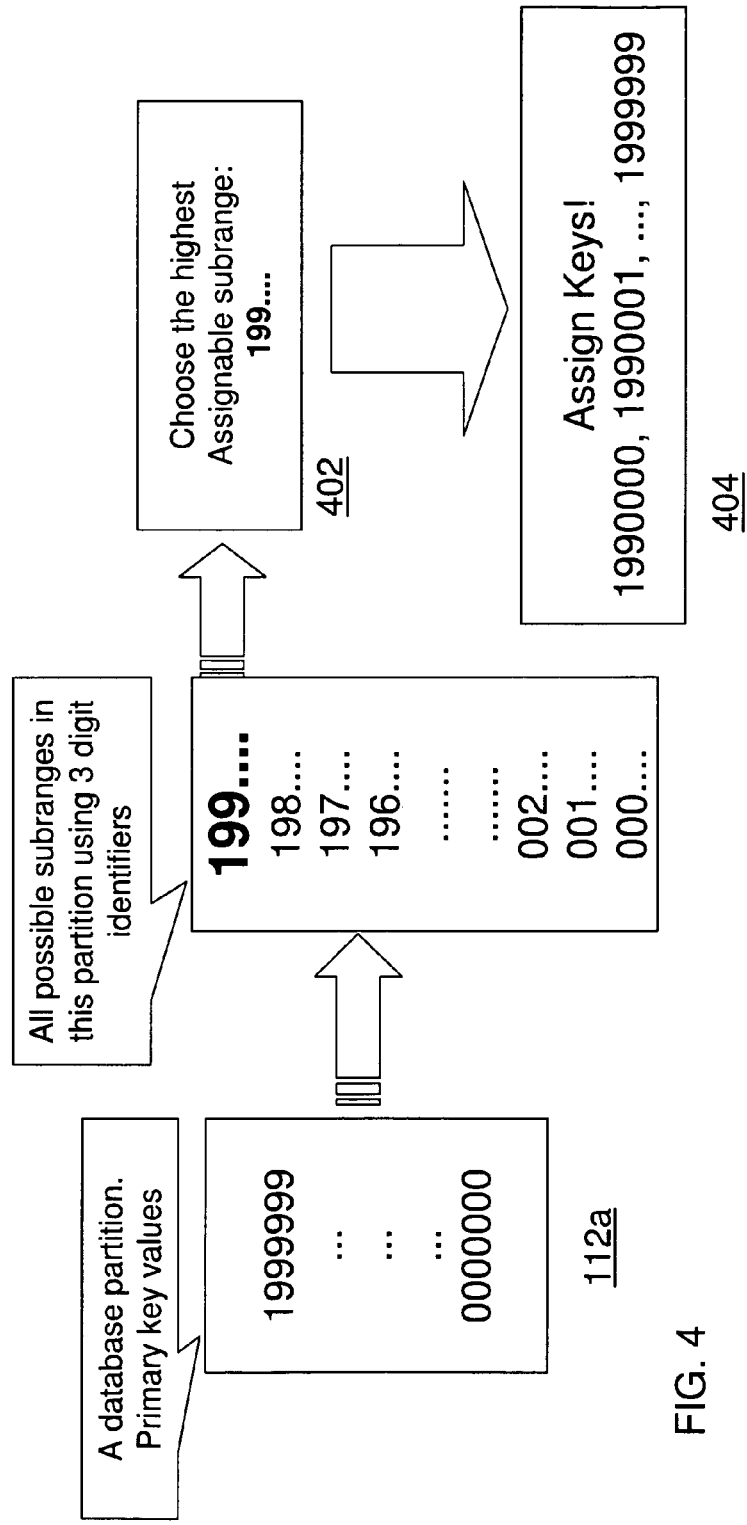
FIG. 4 shows the procedure for choosing a partition subrange for key assignment.

FIG. 4 shows the procedure for choosing a partition subrange for key assignment. In this example, we are looking at partition 112a (P1) of FIG. 3, with partition key values ranging between 0000000 and 1999999 and (three-digit) subrange identifiers ranging between 000 and 199. To assign a key, one first chooses the highest available subrange, in this case subrange 199 (step 402). One then assigns keys from this subrange in ascending order, beginning with 1990000 and ending with 1999999 (step 404).

Figure 5:
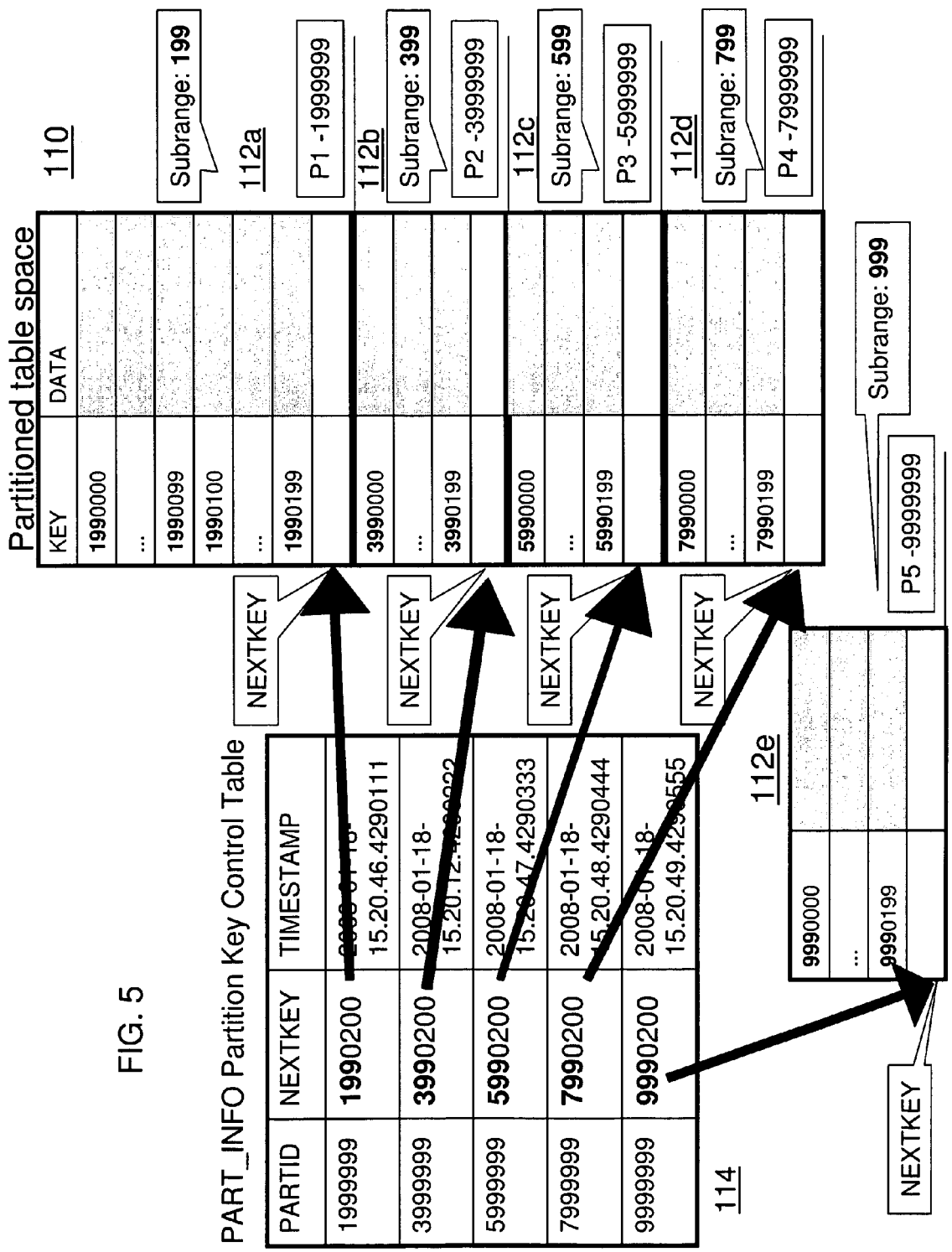
FIG. 5 shows the database mapping of the partitioned table space to the partition key control (PART_INFO) table.

Referring now to FIG. 5, to manage partition key assignments within individual application instances 106, the embodiment shown makes use of partition key control table 114 (PART_INFO). The partition key control table 114 contains information on the partitioning of the table space: i.e., the high key value for each partition 112 (PartId), the next "base" key available for assignment (nextKey), and a timestamp field (timeStamp) indicating the last time nextKey was updated. The value nextKey is referred to as a base key because, when an application 106 retrieves a nextKey value from the PART_INFO table 114, it also reserves a block of keys following nextKey. Thus, the new nextKey value is not nextKey+1, but rather the previous nextKey value incremented by a particular block size. In the PART_INFO table 114 shown in FIG. 5, the block size used is 100 keys. However, a larger or smaller block size could be used as dictated by the needs of a particular implementation.

Each partition 112 is represented as a row in the PART_INFO table 114. In this example, FIG. 5 shows a database 110 containing five partitions 112a-112e (P1-P5). Thus, in the first row of the PART_INFO table 114, corresponding to the partition 112a (P1) with a high key value of 1999999, PartId is 1999999, while nextKey is 1990200, indicating that 1990200 is the next base key available for assignment within that partition. The nextKey value of 1990200 is within the partition subrange with identifier 199; thus, keys are assigned from this partition subrange. Finally, timeStamp is 2008-01-18-15.20.46.4290111, indicating the date (yyyy-mm-dd) and time (hh.mm.ss.sssssss) of the last update to the nextKey value. Similarly, in the second row of the PART_INFO table 114, corresponding to the partition 112b (P2) with a high key value of 3999999, PartId is 3999999, while nextKey is 3990200, indicating that 3990200 is the next base key available for assignment within that partition, and likewise for the three remaining rows shown. In the embodiment shown, the rightmost two digits of the assigned key are left unspecified in the PART_INFO table 114 (i.e., the base key nextKey is incremented in steps of 100) to allow sequencing of those digits from 00 to 99 without having to update the PART_INFO table 114 for each individual key assignment.

Table Initialization

Figure 6:
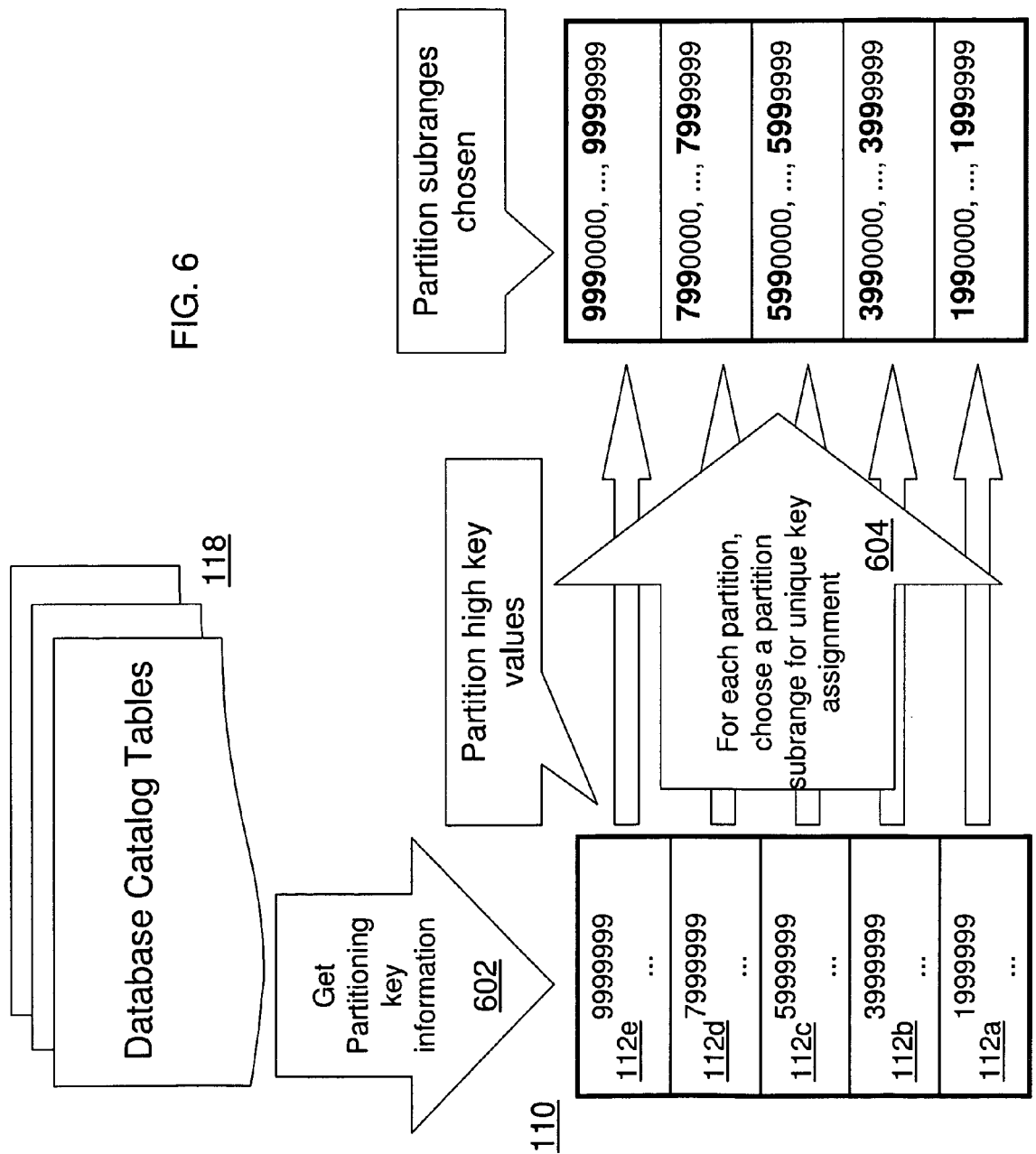
FIG. 6 shows the procedure for getting partitioning information.
Figure 7:
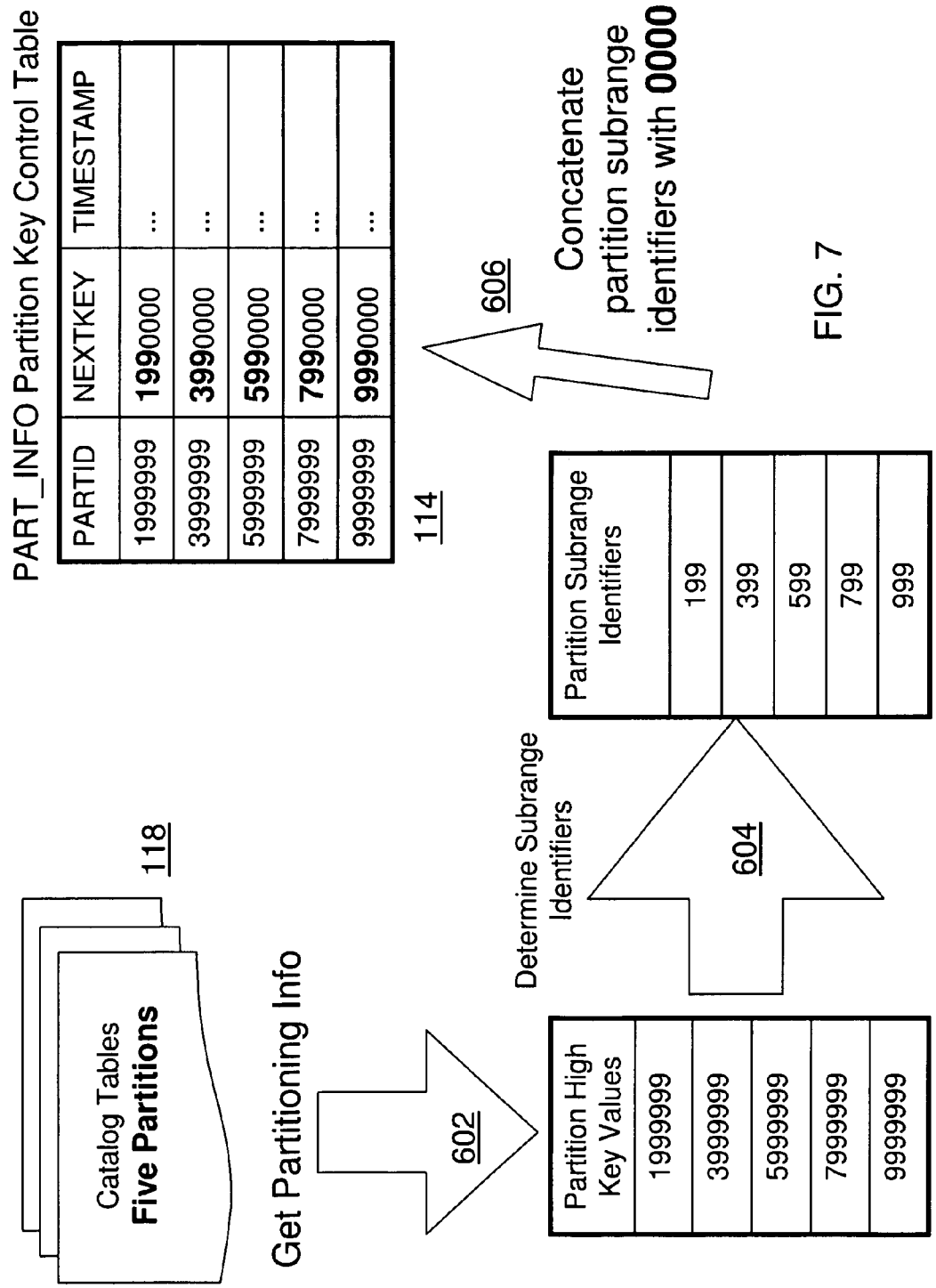
FIG. 7 shows the procedure for building a fresh partition key control (PART_INFO) table.

FIGS. 6 and 7 show the procedure for getting partition information for initializing the PART_INFO table 114. FIG. 6 shows how the subrange identifiers are determined for each partition 112, while FIG. 7 shows how the nextKey values are created from the subrange identifiers. Referring first to FIG. 6, when an application 106 starts with an empty database 110, the procedure interrogates database catalog tables 118 managed by the database to determine the high key value of each partition 112 in the database (step 602). The procedure then selects a partition subrange for each partition 112 such that the keys that can be generated from that partition subrange have values that are greater than any other key values that can be generated from other partition subranges within the same partition. In this example, the algorithm uses the first three digits of the key as the partition subrange identifier, so we look at the first three digits and choose the highest partition subrange possible. This is shown in FIG. 5, where the partition subrange identifier (199) of nextKey for partition 112a is equal to the first three digits of the partition high key value (1999999). Referring now to FIG. 7, the value nextKey is then constructed by concatenating the partition subrange identifier with zeros, indicating that the application is starting with an empty database 110 (step 606). Finally, timeStamp is updated with the current time.

Procedure Following Repartitioning

Since the procedure shown in FIGS. 6 and 7 operates by storing partition high key values and other partition-specific information in the PART_INFO table 114, when the user repartitions the database 110 by adding partitions or deleting partitions 112 or changing partition boundaries, the PART_INFO table 114 is updated. During application startup, the procedure checks to determine whether the database 110 has been repartitioned by comparing partition high key values retrieved from the database catalog tables 118 with those stored in the PART_INFO table 114. If the procedure detects that the database 110 has been repartitioned, it then executes a series of steps to update the contents of the PART_INFO table 114.

FIG. 8 shows the procedure for updating an existing partition key control table 114 (PART_INFO) due to a change in database partitioning, with the end result being an updated table 114'. First, the procedure iterates through the nextKey column of the PART_INFO table 114, removing the subrange identifier from each key (step 802). The procedure keeps track of the largest value produced (lgVal) so that, at the end of the iteration, lgVal is determined for the table 114 as a whole (step 804). Once this is done, the procedure selects partition subranges based on the principle discussed previously (i.e., the highest available subrange for a particular partition 112), and concatenates each partition subrange identifier with lgVal, creating the next base key for that partition subrange (nextKey) (step 806). These keys serve as the starting point for key assignments inside each partition 112. Finally, timeStamp is updated with the current time.

In the particular example shown in FIG. 8, the same key range (0000000 to 9999999) that was formerly organized into five equal-size partitions 112 is reorganized into four partitions, also of equal size, as shown in the updated table 114'. The largest value (lgVal) in the least significant four-digit portion of nextKey in the former arrangement is 0300 (which occurs in two instances). This lgVal of 0300 is therefore used as the initial value in the least significant four-digit portions of nextKey for each of the four partitions 112 in the new arrangement, resulting in respective nextKey values of 2490300, 4990300, 7490300 and 9990300 in the updated table 114'.

By now it should be clear that one aspect of the present invention is that it achieves the goal of always inserting new data at the end of each partition 112 by generating new keys for each partition which are always greater than keys previously assigned in the partition. This is ensured by the following:

1. Using the highest partition subrange identifier for each partition 112, both when the database 110 is first used and any time repartitioning is detected.
2. Using a monotonically increasing value for the nextKey within the partition subrange during key assignment.
3. When repartitioning is detected, adjusting all nextKey values based on the highest value within the previous set of nextKey values.

Partition Control Blocks

In addition to the PART_INFO table 114 (FIG. 5) that stores partition-related information and is commonly accessed by the application instances 106, each application instance maintains a set of control blocks 116, one control block for each partition 112, that are accessed only by threads 108 of that application instance. FIG. 9 shows the logical arrangement of the in-memory structure or control block 116 (DB_PARTITION) that contains information about its corresponding partition 112; some of this information (PartId and baseKey) is also stored in the PART_INFO table 114. A linked list implemented by the depicted next partition pointer (nextPartition) is used to chain the set of DB_PARTITION structures 116, where each structure represents a partition 112 and corresponds to a row in the PART_INFO table 114. The structure 116 also includes a key sequence number (nextKey-Sequence), which has a range from 00 to 99, and a current active threads count (refCount) field to control access in multithreaded applications 106.

Each partition control block 116 (DB_PARTITION) is identified by the partition high key value (PartId) and contains a counter (refCount) that tracks the number of threads 108 currently working inside the partition 112. This refCount value is used to direct concurrent threads 108 to insert new data into separate partitions 112 to reduce contention and deadlocks. When an application 106 needs a new key, the procedure invoked by the application first searches among the partition control blocks 116 for a partition 112 with the lowest refCount value. The partition 112 with the lowest refCount should have the fewest threads 108 currently working in the partition.

If only one partition 112 has the lowest refCount value, then the procedure assigns a key from that partition using the key assignment procedure described below. The partition's refCount is incremented by one to indicate that an additional thread 108 is now working in the partition 112. Once the thread 108 finishes its unit of work inside the database partition 112, it then decrements the refCount associated with the partition.

During key assignment, the embodiment shown does not actually query the PART_INFO table 114 for every key that it assigns. As indicated above, it has a mechanism in which keys are reserved in 100-key blocks on a per partition basis, and the PART_INFO table 114 is only queried when another block of keys are reserved for assignment. To keep track of keys assigned from the reserved block, the partition control block 116 utilizes an incrementing sequence number (nextKeySequence) that, when added to the base key, creates the actual key that is used to identify new data. When the embodiment shown selects a partition 112 with remaining reserved keys, the key is simply constructed without referencing the PART_INFO table 114.

Key Assignment

Figure 14:
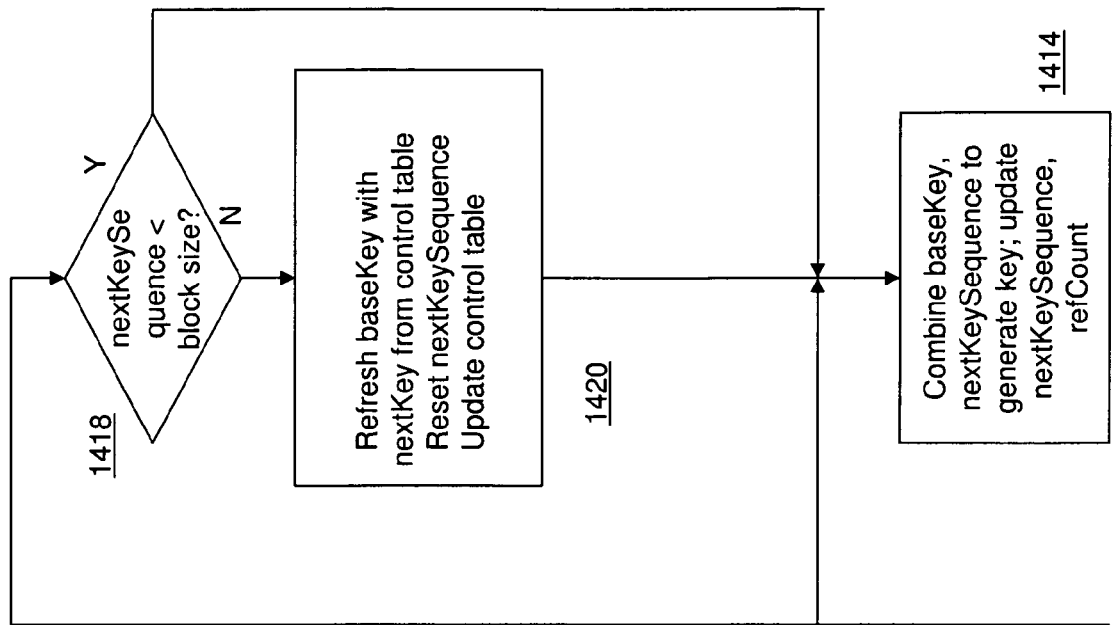
FIG. 14 shows the overall procedure for assigning partition keys.
Figure 14:
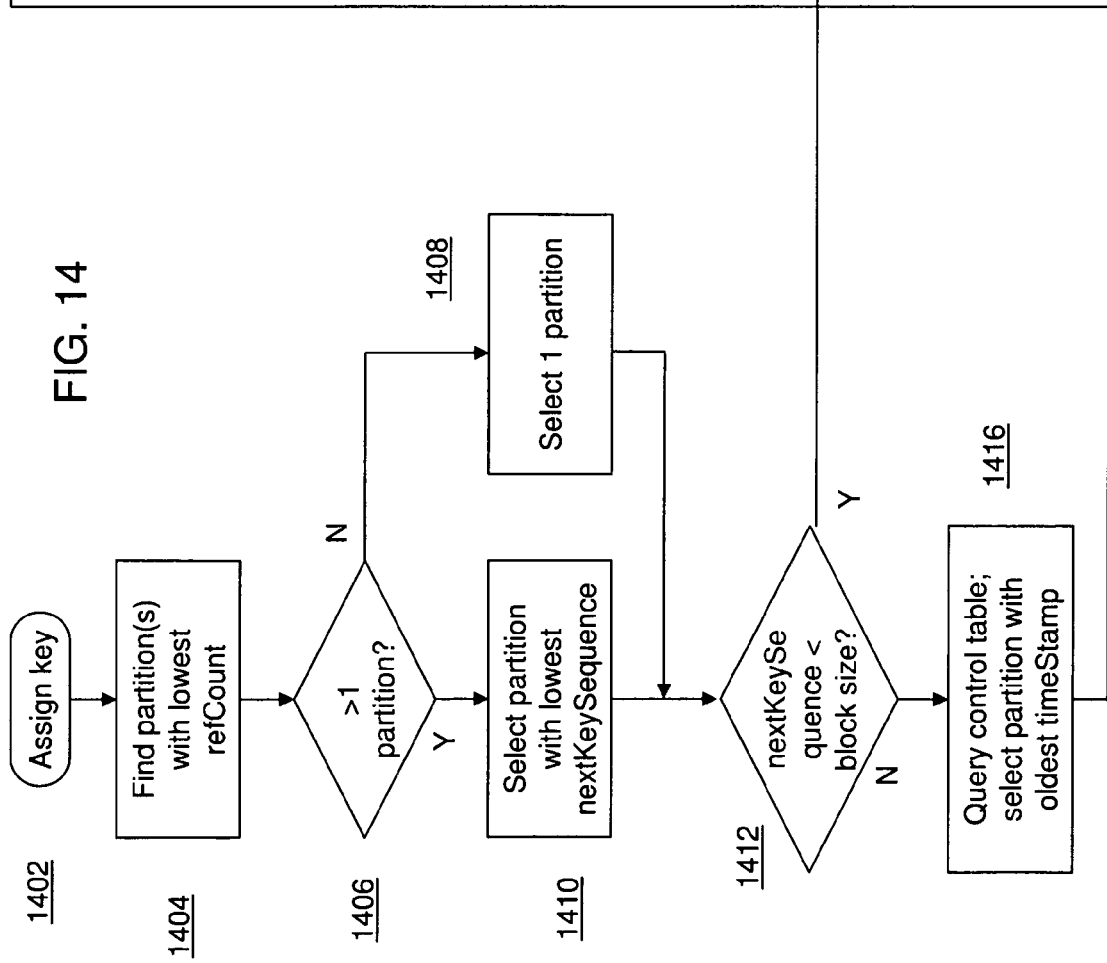

FIG. 14 shows the overall procedure for assigning partition keys, which is invoked by a thread 108 and is performed by the corresponding application instance 106. Upon being invoked (step 1402), the procedure accesses the partition control blocks 116 for the corresponding application instance 106 to determine the partition or partitions 112 with the lowest refCount (step 1404). If there is only one such partition 112 (step 1406), the procedure tentatively selects that partition (step 1408). If there is more than one partition 112 with a lowest refCount, then the procedure tentatively selects from those partitions the partition with the lowest nextKeySequence (step 1410). This has the effect of evenly distributing keys among partitions 112 that have the same number of working threads.

The procedure then determines whether the partition 112 tentatively selected in step 1408 or 1410 has any remaining reserved keys by comparing nextKeySequence in the corresponding control block 116 with the block size (in this embodiment, assumed to be 100 keys) (step 1412). If nextKeySequence is less than the block size, meaning that there are reserved keys remaining, then the procedure (1) adds baseKey and nextKey together to generate the partition key, (2) increments nextKeySequence to indicate that an additional key has been assigned, and (3) increments refCount to indicate that another thread 108 is now accessing the partition 112 (step 1414).

If at step 1412 nextKeySequence is equal to or greater than the block size, meaning that there are no reserved keys remaining in the control block 116 for this partition 112, then the procedure queries the control table 114 and selects the partition 112 with the oldest timestamp in that table, discarding its previous tentative selection of a partition; the procedure does not update table 114 at this time, however, since the table is merely being queried to determine the oldest timestamp (step 1416). If the newly selected partition 112 has reserved keys remaining in its partition control block 116, as determined by comparing its nextKeySequence with the block size (1418), then the procedure creates a key from the baseKey and nextKeySequence values in that control block, as described above (step 1414). If, on the other hand, the newly selected partition 112 has no reserved keys remaining, then the procedure reserves another block of keys by setting baseKey equal to the current value of nextKey in the corresponding row of control table 114 and resetting nextKeySequence to 0; the procedure also updates the row in control table 114 by incrementing nextKey by the block size and setting timestamp equal to the current time (step 1420). Thereafter, the procedure assigns a key from the newly selected partition 112 in the manner described above (step 1414).

Figure 10:
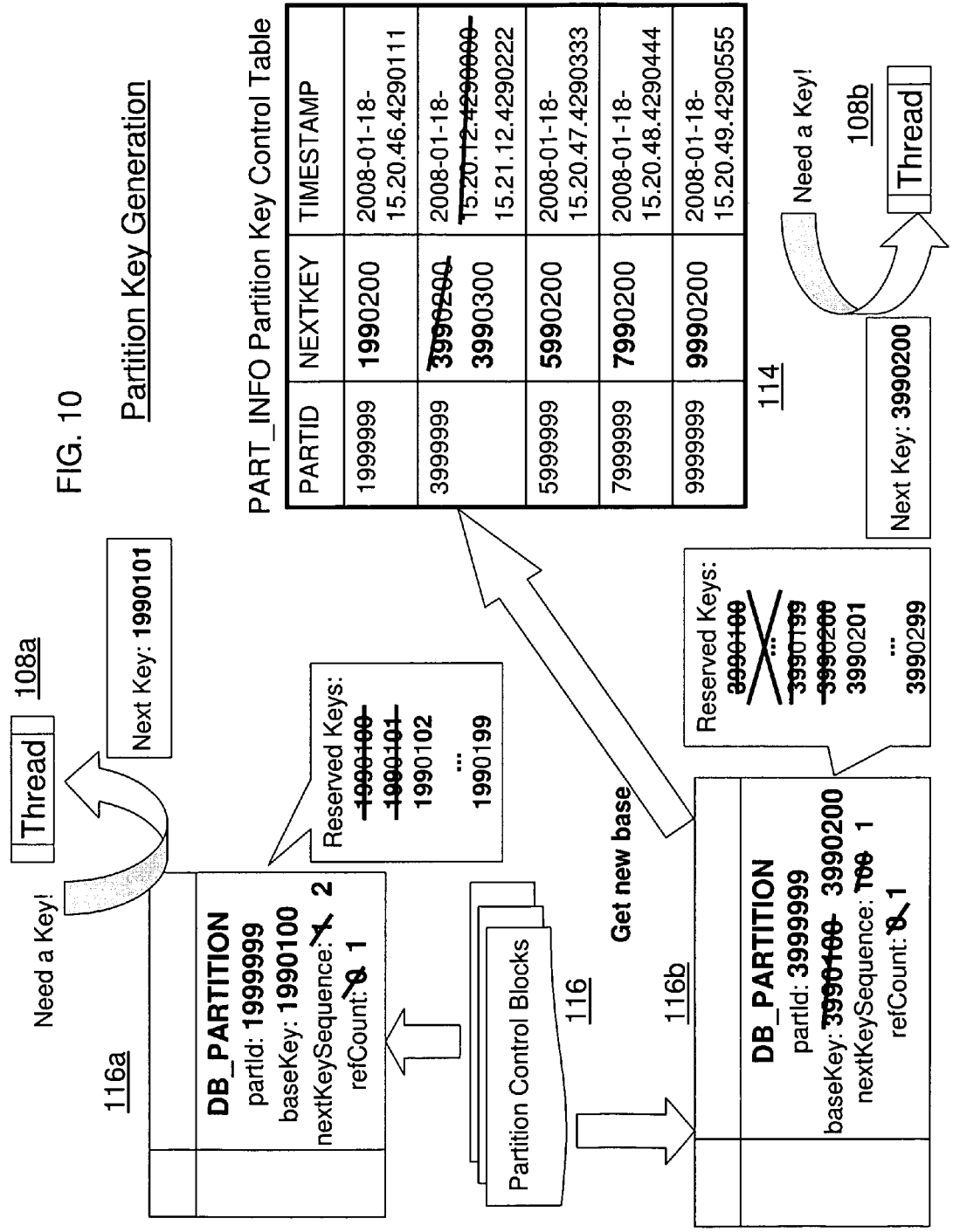
FIG. 10 illustrates how unique keys are assigned using the DB_PARTITION in-memory structure and the partition key control table.

FIGS. 10-13 further illustrate various aspects of the key assignment procedure shown in FIG. 14. FIG. 10 shows this procedure for first and second threads 108a and 108b and first and second partition control blocks 116a and 116 representing respective partitions 112a and 112b (FIG. 5), assumed in this example to be the only partitions in the database 110. At the time thread 108a requests a key, refCount for both control blocks 116a and 116b is 0; however, control block 108a has a lower nextKeySequence of 1. Accordingly, the first thread 108a obtains a key in partition 112a (FIG. 5), represented by control block 116a. As shown in the figure, the actual key created for thread 108a is 1990101, the sum of 1990100 (baseKey) and 1 (nextKeySequence) in control block 116a. Thread 108a does not go to the PART_INFO table 114 to get nextKey, because the nextKeySequence value stored in control block 116a is 1. After making the key assignment, thread 108a (i.e., the procedure acting on its behalf) increments the nextKeySequence value to 2, as shown in FIG. 10. Thread 108a also increments the value refCount, representing the number of threads 108 currently inserting new data into the partition 112a represented by control block 116a, from 0 to 1 (as also shown in the figure).

At the time thread 108b requests a key, partition 112b is tentatively selected since control block 116b has the lowest refCount of 0. In this case, however, the control block representing the tentatively selected partition has a nextKeySequence value of 100. Since this is equal to the block size, the procedure checks the control table 114 to determine the partition row with the oldest timestamp and selects that partition instead. In this example, we will assume that this oldest row is also partition 112b. Since nextKeySequence for partition 112b is equal to the block size, the procedure replaces the existing value of baseKey with the current value (3990200) of nextKey from the corresponding row of partition key control table 114, then, in the same transaction, increments the current value of nextKey in table 114 by the block size to a new value of 3990300 (in preparation for a future baseKey update), updates timeStamp in table 114, and resets nextKeySequence to 0. As a result, keys ranging from baseKey to baseKey+BLOCKSIZE−1 (3990200 through 3990299) have been reserved by the procedure for the partition 112b represented by control block 116b. The procedure then assigns the key using the nextKey it retrieved (and saved as baseKey) and nextKeySequence, so it assigns a key of 3990200. It then increments nextKeySequence to 1 in preparation for the next key assignment. The procedure also increments refCount of control block 116b from 0 to 1, just as it incremented the refCount of control block 116a for the first thread 108a.

Figure 11:
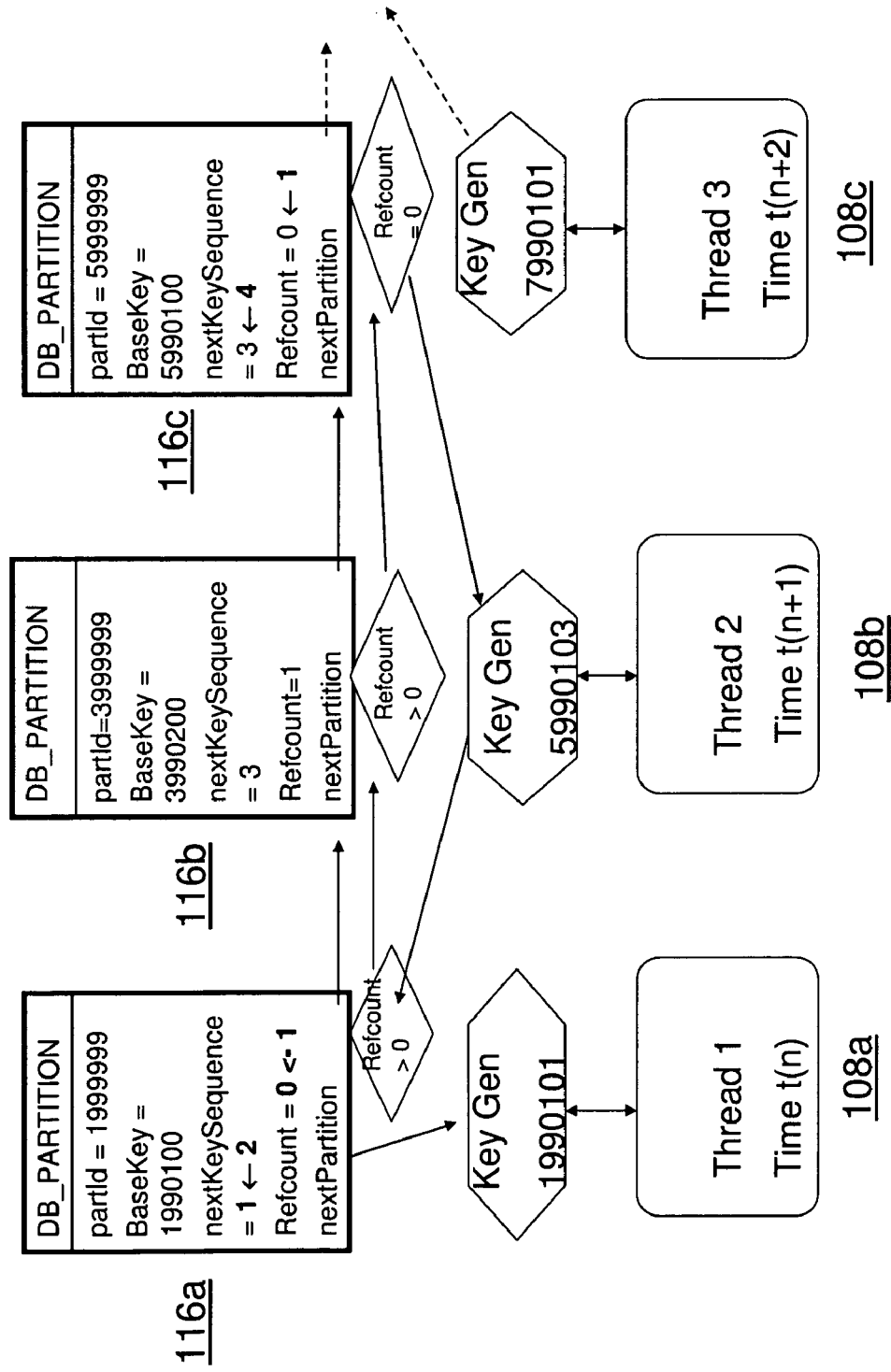
FIG. 11 illustrates how unique keys are assigned in a multithreaded application using a linked list of DB_PARTITION structures.

FIG. 11 shows another example of how unique keys are assigned in a multithreaded application 106 using a linked list of DB_PARTITION structures 116. In the example shown in FIG. 11, thread 108a (thread 1) requests a new partition key at time t(n). The procedure assigns thread 108a a new key from partition 112a (FIG. 5), represented by control block 116a, because this partition has the lowest refCount (along with partition 112c), as well as a lower nextKeySequence than partition 112c. Since the values of baseKey and nextKeySequence stored in control block 116a are currently 1990100 and 1, respectively, the key assigned to thread 108a is 1990101, the sum of these two values. The value nextKeySequence for control block 116a is then updated from 1 to 2, and refCount for the same control block is incremented from 0 to 1, as shown in the figure. (In the "x←y" notation used in FIG. 11, y is an updated value that replaces a current value x.)

At time t(n+1) thread 108b (thread 2) requests a new key. At time t(n+1), partitions 112a and 112b represented by control blocks 116a and 116b are both in use, each with a refCount of 1, however partition 112c represented by control block 116c has a refCount of 0, lower than that of either of the other two partitions 112a and 112b. Thread 108b is therefore assigned a new key from partition 112c. The values of baseKey and nextKeySequence stored in control block 116c are currently 5990100 and 3, respectively. Therefore, the key assigned to thread 108b is 5990103, the sum of these two values. The value nextKeySequence for control block 116c is then updated from 3 to 4, and refCount for the same control block is incremented from 0 to 1, as shown in the figure.

Finally, at time t(n+2), thread 108c (thread 3) requests a new key. At time t(n+2), partitions 112a-112c represented by control blocks 116a-116c are all in use, each with a refCount of 1, however a scan finds partition 112d (FIG. 5) represented by a control block (not shown in FIG. 11) with a refCount of 0. Thread 108c is therefore assigned a new key from partition 112d. The values of baseKey and nextKeySequence currently stored in the control block for partition 112d are in this example 7990100 and 1, respectively. Therefore, the key assigned to thread 108c is 7990101, the sum of these two values. The value nextKeySequence for the control block for partition 112d is then updated from 1 to 2, and refCount for the same control block is incremented from 0 to 1.

Figure 12:
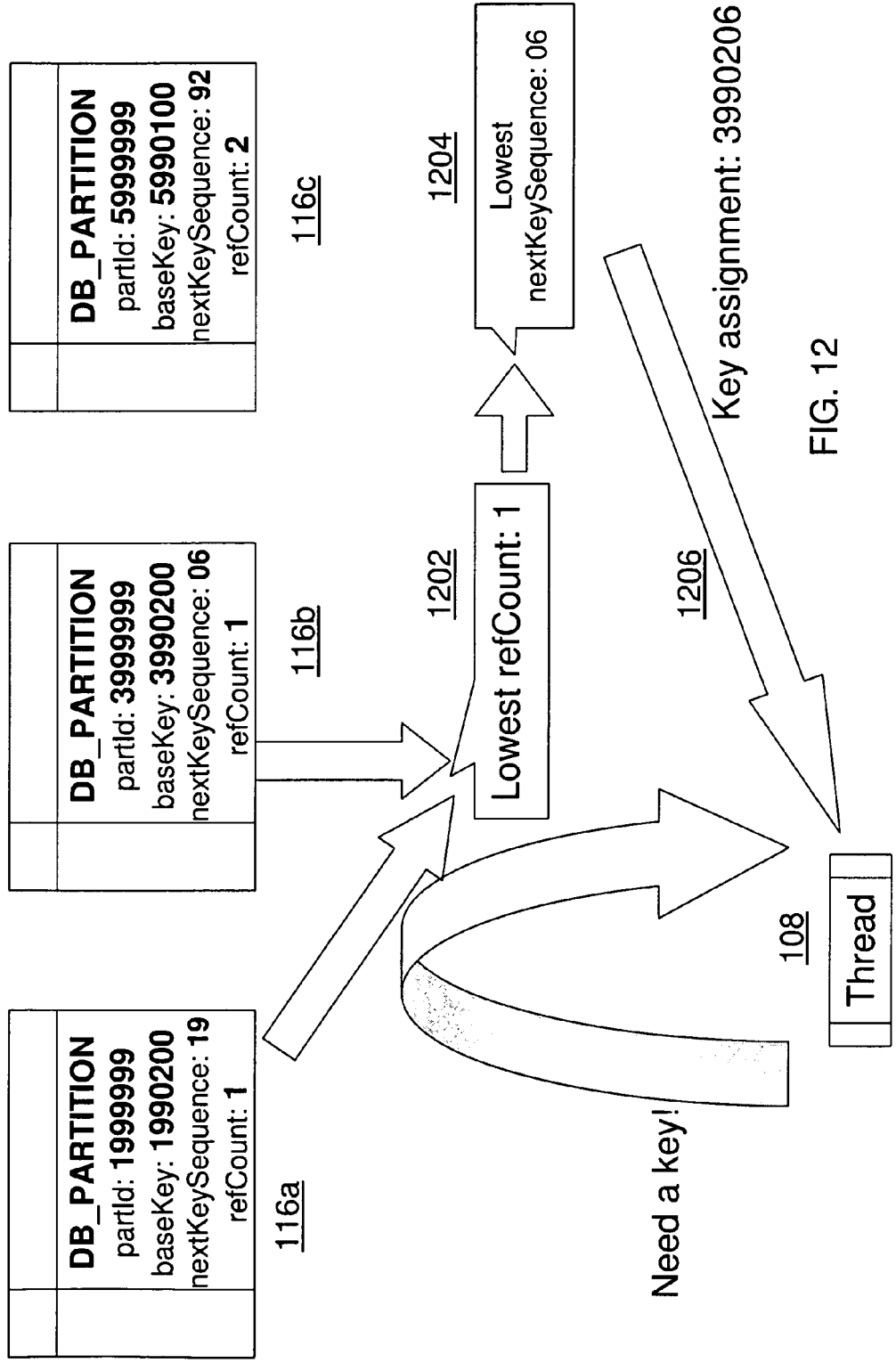
FIG. 12 shows the procedure for key assignment in a multiple threaded application with multiple lowest refCounts.

FIG. 12 shows yet another example of key assignment. In this example, when a particular thread 108 requests a partition key, partition 112a (FIG. 5) represented by control block 116a has a refCount of 1, a baseKey of 1990200, and a nextKeySequence of 19; partition 112b represented by control block 116b has a refCount of 1, a baseKey of 3990200, and a nextKeySequence of 06; and partition 112c represented by control block 116c has a refCount of 2, a baseKey of 5990100, and a nextKeySequence of 92. The procedure first looks for subset of partitions 112 with the lowest refCount in their control blocks 116 (step 1202). If there had been only one partition 112 in this subset, the procedure would select that partition without having to compare nextKeySequence values. Since, however, the first two partitions 112a and 112b in this particular example both have the same lowest refCount of 1, the procedure selects from this subset of partitions the one having the lowest nextKeySequence, in this case partition 112b represented by control block 116b with a nextKeySequence of 06 (step 1204). The procedure then adds the nextKeySequence of the selected partition 112b (here, 06) to the baseKey of the selected partition (here, 3990200) to generate a partition key of 3990206, which it gives to the requesting thread 108 (step 1206). Although not shown in FIG. 12, the procedure then increments refCount and nextKeySequence for the selected partition 112b (to 2 and 07, respectively) in preparation for a subsequent request from the same or a different thread 108. The value refCount for the selected partition 112b is later decremented when the requesting thread 108 completes its access to the database 110.

Multiple Application Instances

The disclosed embodiment also balances key distribution across partitions 112 when multiple instances 106 of an application are sharing the database 110. Here, the instances 106 do not have access to each others' internal partition control blocks 116 (the DB_PARTITION structures), but do have access to the PART_INFO table 114, which is commonly available to all application instances. Assigning the partition 112 with the oldest timestamp ensures that concurrent threads in all instances of the application insert into separate partitions.

Figure 13:
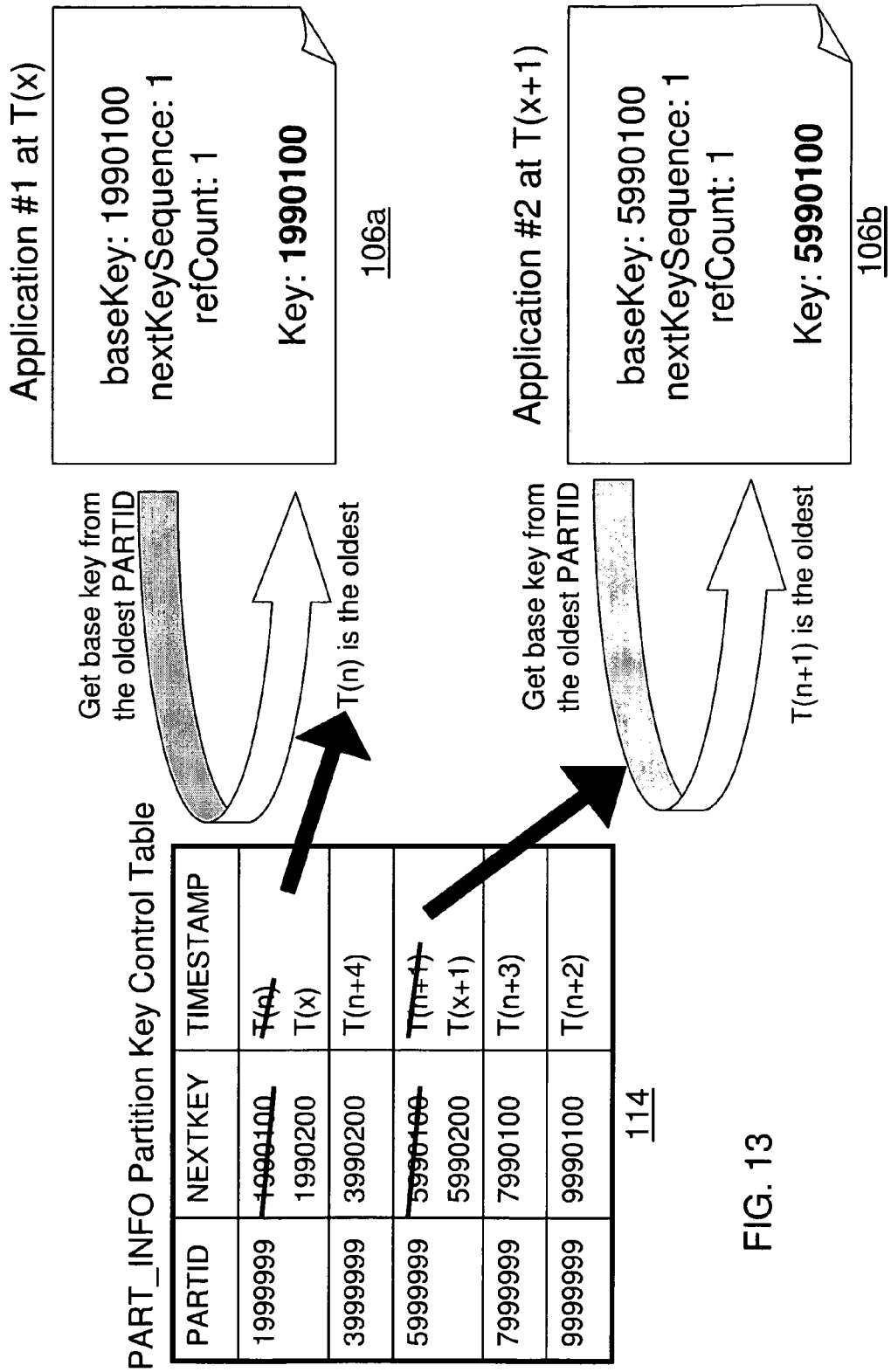
FIG. 13 illustrates how unique keys are assigned and balanced in a shared database environment.

FIG. 13 illustrates how unique keys are assigned and balanced in a shared database environment, i.e. multiple applications 106 sharing the same PART_INFO table 114. In general, if an application 106 requires a new baseKey, then the application fetches and locks the oldest row (as indicated by timeStamp) in the PART_INFO table 114. After the nextKey value for that row is used to update baseKey, the nextKey and timeStamp values for that row are updated in the table 114, generally resulting in a new "oldest" partition 112. The next application 106 to require a new baseKey obtains one from the new "oldest" partition 112, thus avoiding having multiple applications reuse the same partition when obtaining a new baseKey for unique key generation.

This is shown in FIG. 13, where two application instances 106a and 106b (applications 1 and 2) sharing the same database 110 are inserting into two different partitions 112. In the figure, application 106a requests a new reserved block of keys at time t(x). It searches the PART_INFO table 114 for the partition 112 with the oldest timeStamp. The partition 112 with PartId 1999999 has the oldest timeStamp, t(n), so application 1 selects this partition. (We are assuming here that the partition 112 selected at step 1416 in FIG. 14 has no more reserved keys at step 1418.) Application 1 then updates the corresponding timeStamp to t(x) in the same transaction. Subsequently, application 106b needs a new reserved block of keys at time t(x+1). This time, the partition 112 with the oldest timeStamp, t(n+1), has PartId 5999999, so application 2 selects this partition and updates the corresponding timeStamp to t(x+1).

While a particular set of embodiments have been shown and described, various modifications will be apparent to those skilled in the art.

What is claimed is:

1. In an information handling system a method for generating said partition key, comprising the steps of:

dividing a plurality of entries of a database table into a plurality of partitions, each of said partitions having a corresponding range of partition keys, each of said entries being assigned to one of said partitions in accordance with a partition key generated for each entry;

generating, on a computing device, a partition subrange identifier specifying a subrange of key values in one of said partitions;

generating a sequence number specifying a particular key value within a subrange;

generating said partition key by combining said partition subrange identifier and said sequence number;

maintaining a control table that stores, for each partition, a highest key and a base key value specifying a block of key values from which new keys are currently being assigned from; and responsive to a repartitioning of the database into a plurality of new partitions, updating said control table to store for each of said new partitions a highest key value and a repartitioned base key value specifying a new block of key values from which new keys are currently being assigned from, wherein the repartitioned base key value stored for each of said new partitions comprises a combination of a partition subrange identifier and a base key sequence number, wherein the base key sequence numbers stored for the new partitions after repartitioning are equal to the largest value of any of the base key sequence numbers before repartitioning, wherein the base key sequence number is increased for each entry inserted into the database table from beginning key value of a partition.

2. The method of claim 1 in which said one of said partitions has a plurality of subranges of key values, said partition subrange identifier specifying a highest available subrange of key values in said one of said partitions.

3. The method of claim 1 in which said step of generating a sequence number comprises the step of incrementing a previous sequence number.

4. A non-transitory storage device readable by a computer, embodying a program of instructions executable by the computer to perform steps of:

dividing a plurality of entries of a database table into a plurality of partitions, each of said partitions having a corresponding range of partition keys, each of said entries being assigned to one of said partitions in accordance with a partition key generated for each entry;

generating, on a computing device, a partition subrange identifier specifying a subrange of key values in one of said partitions;

generating a sequence number specifying a particular key value within a subrange;

generating said partition key by combining said partition subrange identifier and said sequence number;

maintaining a control table that stores, for each partition, a highest key and a base key value specifying a block of key values from which new keys are currently being assigned from; and responsive to a repartitioning of the database into a plurality of new partitions, updating said control table to store for each of said new partitions a highest key value and a repartitioned base key value specifying a new block of key values from which new keys are currently being assigned from, wherein the repartitioned base key value stored for each of said new partitions comprises a combination of a partition subrange identifier and a base key sequence number, wherein the base key sequence numbers stored for the new partitions after repartitioning are equal to the largest value of any of the base key sequence numbers before repartitioning, wherein the base key sequence number is increased for each entry inserted into the database table from beginning key value of a partition.

\* \* \* \* \*